(12) United States Patent
Mohr et al.

(10) Patent No.: US 8,652,005 B2
(45) Date of Patent: Feb. 18, 2014

(54) TRANSMISSION ARRANGEMENT FOR A VEHICLE

(75) Inventors: Mark Mohr, Tettnang (DE); Matthias Reisch, Ravensburg (DE); Jurgen Wafzig, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 70 days.

(21) Appl. No.: 13/387,877

(22) PCT Filed: Jul. 26, 2010

(86) PCT No.: PCT/EP2010/060775
§ 371 (c)(1),
(2), (4) Date: Jan. 30, 2012

(87) PCT Pub. No.: WO2011/018328
PCT Pub. Date: Feb. 17, 2011

(65) Prior Publication Data
US 2012/0125731 A1 May 24, 2012

(30) Foreign Application Priority Data

Aug. 10, 2009 (DE) .......................... 10 2009 028 387

(51) Int. Cl.
*F16D 13/04* (2006.01)
(52) U.S. Cl.
USPC ....................... 477/83; 192/113.35; 192/85.61
(58) Field of Classification Search
USPC ................. 192/70.12, 113.34, 113.35, 85.61, 192/113.3
See application file for complete search history.

(56) References Cited

U.S. PATENT DOCUMENTS

| | | | |
|---|---|---|---|
| 2,333,161 A | 11/1943 | Dunn | |
| 5,310,388 A * | 5/1994 | Okcuoglu et al. | 475/88 |
| 6,330,928 B1 * | 12/2001 | Sekiya et al. | 180/242 |
| 7,234,579 B2 * | 6/2007 | Grethel et al. | 192/48.91 |
| 7,308,977 B2 * | 12/2007 | Maguire et al. | 192/85.24 |
| 7,951,043 B2 | 5/2011 | Reisch et al. | |
| 8,151,965 B2 * | 4/2012 | Linortner et al. | 192/85.02 |
| 2005/0194229 A1 * | 9/2005 | Grethel et al. | 192/48.8 |
| 2009/0045027 A1 * | 2/2009 | Linortner et al. | 192/103 F |
| 2010/0014994 A1 | 1/2010 | Fischer et al. | |
| 2012/0125731 A1 * | 5/2012 | Mohr et al. | 192/84.1 |

FOREIGN PATENT DOCUMENTS

| | | |
|---|---|---|
| DE | 39 13 412 A1 | 10/1990 |
| DE | 10 2005 003 508 A1 | 8/2005 |
| DE | 10 2005 013 137 A1 | 9/2006 |
| DE | 10 2005 029 967 A1 | 1/2007 |
| DE | 10 2005 042 360 A1 | 3/2007 |
| EP | 2 072 862 A2 | 6/2009 |
| WO | 2008/031844 A1 | 3/2008 |

* cited by examiner

*Primary Examiner* — David D Le
*Assistant Examiner* — Steven B Christ
(74) *Attorney, Agent, or Firm* — Davis & Bujold, PLLC; Michael J. Bujold

(57) ABSTRACT

A transmission configuration for a vehicle with at least a wet clutch (7) functioning as starting element. A coolant and a lubricant supply is provided via at least a pump device (5) which can be driven by a drive motor (1) of the vehicle. The pump device (5) can be driven in such a way that the conveyed flow volume of the pump device (5) is proportional to the rotational speed difference between the rotational speed of the drive motor (1) and the rotational speed of the clutch (7) which is designed and functions as the starting element.

10 Claims, 1 Drawing Sheet

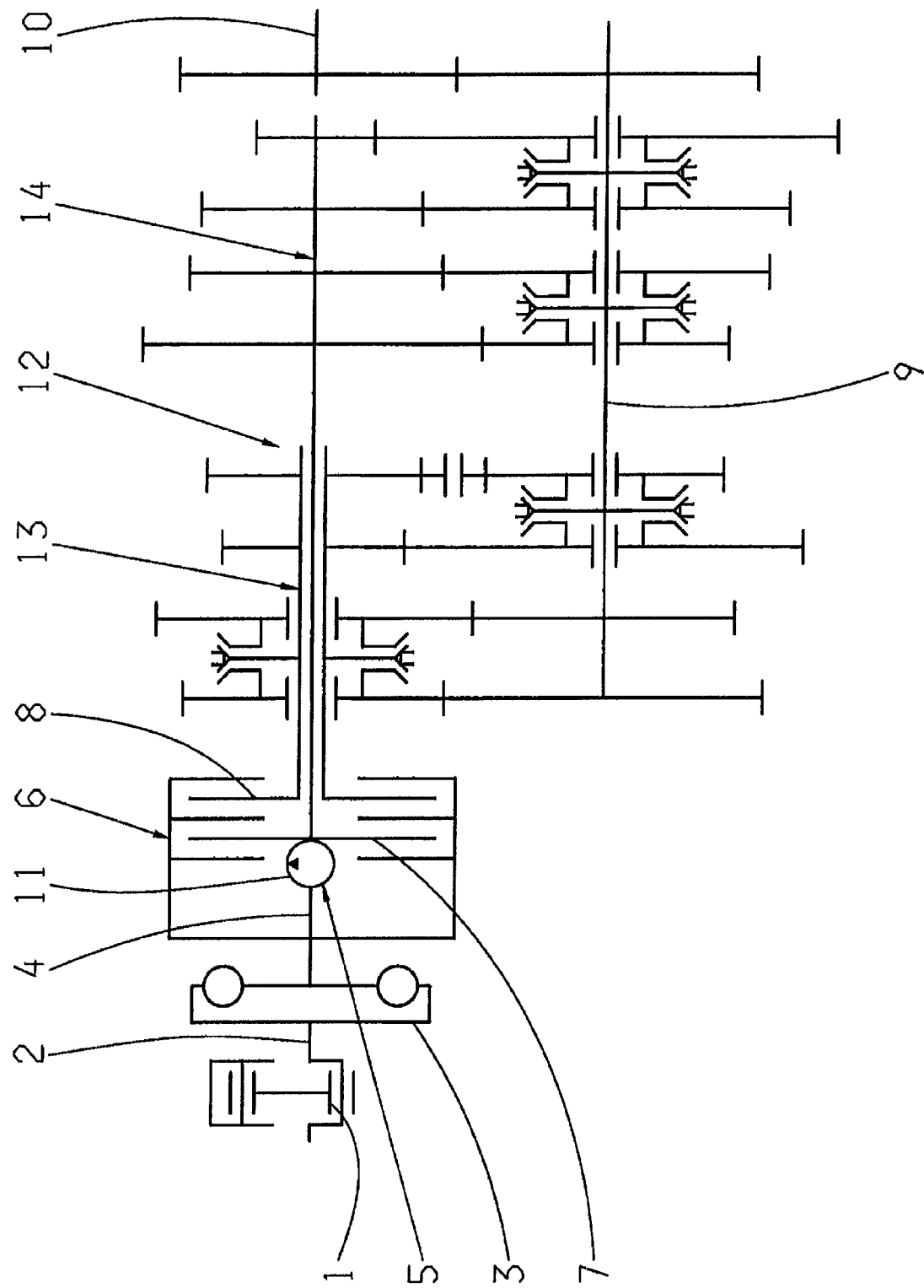

TRANSMISSION ARRANGEMENT FOR A VEHICLE

This application is a national stage completion of PCT/EP2010/060775 filed Jul. 26, 2010 which claims priority from German Application Serial No. 10 2009 028 387.0 filed Aug. 10, 2009

FIELD OF THE INVENTION

The present invention concerns a transmission arrangement for a vehicle with at least a wet clutch as a starting element.

BACKGROUND OF THE INVENTION

Automatic transmissions, for instance for motor vehicles, are adequately known in automotive engineering. Besides automatic transmissions with planetary sets, load shift elements, and with a converter as starting element, double clutch transmissions are also increasingly used, which have two independent partial transmissions which, for instance, are operated as spur gear transmissions in a countershaft design with two clutches each. The double clutch transmissions, contrary to automatic transmissions, have the advantage that a better efficiency can be achieved, but the disadvantage is the lower load performance of the starting element.

Through the application of cooled, wet clutches as a starting element, the thermal load performance of the starting element is increased. Hydraulic actuation of the wet clutch, however, requires a large amount of pressure which adversely affects the overall efficiency of the transmission.

SUMMARY OF THE INVENTION

The object of the present invention is to propose a transmission arrangement of the kind described above, in which the load performance of the starting element is increased, without negatively effecting the efficiency.

Thus, a transmission arrangement is proposed for a vehicle with at least one wet clutch as the starting element, wherein a coolant and lubricant supply is provided through at least one pump device or similar, which is driven by a drive motor of the vehicle. In accordance with the invention, the drive of the pump device is designed in a way that the conveyed flow volume or rather the performance of the pump device is proportional to the difference of the rotational speed between the rotational speed of the drive motor and the rotational speed of the clutch which needs to be lubricated or rather cooled.

Thus, a significant advantage arises when the clutch is engaged, namely when there is no difference in rotational speed, that there are no pump losses, so that the efficiency of the transmission, also with an increased load performance of the starting element, is increased overall.

In the context of an advantageous embodiment variation of the invention it can be provided that, for instance, a rotor of the pump device is directly or indirectly connected with the motor shaft of the drive motor and, for instance, a housing of the pump device is directly or indirectly connected with the output of the clutch. As an example, during the starting of the vehicle and when the difference of the rotational speeds is at its maximum, a high conveyed flow volume is created by the pump device, so that it reduces under that condition the large thermal load at the clutch through a large cooling power. With an engaged clutch, however, when nearly no cooling power is required because there is no difference in rotational speed, the conveyed flow volume is reduced to zero, so that no pump losses are created. Thus, a load dependent control of the pump device is realized in this transmission arrangement, even without a costly volume flow control valve.

Preferably, the pump device or rather the drive for the pump device can be positioned in the direction of power flow between the drive motor and the clutch which needs to be cooled or lubricated. Specifically, the drive is hereby located between the input of the transmission and the output of the clutch.

The proposed transmission arrangement can be applied to any transmission version. For instance, if the transmission arrangement is realized with a double clutch transmission, the pump device can be, for instance, at least partially integrated into the double clutch module of the transmission, which results in advantages related to the required space and the installation space. In particular, just the drive of the pump device can be positioned in the double clutch module. However, other design embodiments are also possible.

In the transmission, designed as a double clutch transmission, the housing of the pump device can preferably be connected with the clutch, which is assigned to the lowest gear in the partial transmission, because this clutch is used as the starting element. The other clutch can also be a cooled, wet clutch or a dry clutch.

Independent of which kind of transmission is used in the transmission arrangement, the wet clutch can be preferably designed as a cooled, multidisc plate clutch or similar. It is also possible to apply clutches or rather torque transfer elements with similar characteristics.

In this transmission arrangement, the applied pump device according to the invention, can preferably be a low-pressure lubrication or coolant oil pump. It is also possible here to use other pumps with similar characteristics.

Preferably, the clutch which is designed as the starting element can also be activated electrically, electro-hydraulically, or also magnetically.

In summary, the proposed transmission arrangement combines, among other features, the advantages of a double clutch transmission with the large load performance of a cooled multidisc plate clutch with an arrangement of a low pressure lubrication oil pump in a double clutch module.

BRIEF DESCRIPTION OF THE DRAWINGS

In the following, the present invention is further explained based on the drawing. The sole drawing of this invention shows a schematic cross sectional view of a possible embodiment variation of the inventive transmission arrangement, with a transmission for a vehicle which is designed as double clutch transmission 12.

DETAILED DESCRIPTION OF THE PREFERRED EMBODIMENTS

The drive train shown in the drawing comprises of a drive motor 1 of the vehicle, and its drive shaft 2 is coupled, via a torsion damper 3, with a rotor 4 of a pump device 5 for a lubricant and coolant supply. The pump device 5 is integrated in to a double clutch module 6 of the double clutch transmission 12. The double clutch module 6 comprises of a first clutch 7 which is assigned to a first partial transmission 14 which has no further components shown, and a second clutch 8 which is assigned to a second partial transmission 13 which also has no further components shown. The two partial transmissions 13, 14 each mesh, via gear wheel steps, with a countershaft 9, which is coupled with an output 10 of the double clutch transmission 12.

The pump device 5, which is integrated in the double clutch module 6, is connected with its housing 11 by the first clutch 7, designed as starting element, which is assigned to the partial transmission 14 with its lowest gear. At least the first clutch 7 is designed as a cooled multidisc plate clutch.

Due to the fact that the rotor 4 of the pump device 5 rotates at the rotational speed of the drive motor and that the housing 11 of the pump device 5 rotates at the rotational speed of the output of the clutch 7, the conveyed flow volume of the pump device 5 is proportional to the difference of the rotational speeds between the rotational speed of the drive motor 1 and the rotational speed of the starting element or clutch 7, respectively. Thus, the result is a load dependent control of the pump device 5. Therefore, a costly volume flow control valve and its electro-hydraulic control mechanism can be avoided.

If there is a high difference in the rotational speeds, such as during the start of a race, a maximum conveyed flow volume is achieved with the pump device 5 keeping the terminal load of the clutch 7 as low as possible. With an engaged clutch, meaning during the drive in the odd gears, no pump losses occur because there are no differences in the rotational speed, since the rotor of the pump device 5 rotates with the same rotational speed as the enclosure 11 of the pump device 5. Thus, the efficiency of the automatic transmission is increased also in the case of a large load in the starting element and is almost brought to the efficiency of a manual transmission.

REFERENCE CHARACTERS

1. Drive Motor
2. Drive Shaft
3. Torsion Damper
4. Rotor
5. Pump Device
6. Double Clutch Module
7. First Clutch
8. Second Clutch
9. Lay Shaft
10. Output
11. Enclosure
12. Double Clutch Transmission
13. Second partial Transmission
14. First partial Transmission

The invention claimed is:

1. A transmission arrangement for a vehicle, the transmission arrangement comprising:
at least one wet clutch (7), the wet clutch being a starting element which is engaged to start driving the vehicle,
a coolant and lubricant supply being provided via a pump device (5) which is driven by a drive motor (1) of the vehicle, and
the pump device conveys a flow of the coolant and lubricant such that a volume of the flow of the coolant and lubricant conveyed by the pump device (5) is proportional to a rotational speed difference between a rotational speed of the drive motor (1) and a rotational speed of the wet clutch (7) which is the starting element.

2. The transmission arrangement according to claim 1, wherein the pump device (5) has a rotor that is connected with a drive shaft (2) of the drive motor (1), and a housing (11) of the pump device (5) is connected with an output of the wet clutch (7) which is the starting element.

3. The transmission arrangement according to claim 1, wherein the pump device (5) is positioned, in a direction of power flow, between the drive motor (1) and the wet clutch (7, 8) which is the starting element.

4. The transmission arrangement according to claim 1, wherein the transmission is a double clutch transmission (12) and the pump device (5) is at least partially integrated into a double clutch module (6) of the double clutch transmission (12), the double clutch module comprises the wet clutch and a second clutch.

5. The transmission arrangement according to claim 1, wherein the transmission is a double clutch transmission (12) which comprises a partial transmission (14), the wet clutch and a second clutch, and a housing (11) of the pump device (5) is connected with the wet clutch (7), the transmission comprises a plurality of gears and the wet clutch is engageable to drive the partial transmission (14) which supports a lowest one of the plurality of gears of the double clutch transmission.

6. The transmission arrangement according to claim 1, wherein the wet clutch (7) functioning as which is the starting element is a cooled multidisc plate clutch.

7. The transmission arrangement according to claim 1, wherein the pump device (5) is a relatively low pressure lubrication and cooling oil pump which comprises a housing that is connected to the wet clutch and a rotor that is connectable to a drive shaft of the drive motor.

8. The transmission arrangement according to claim 1, wherein the wet clutch (7, 8) which is the starting element is one of electrically, electro-hydraulically, and magnetically actuated.

9. A transmission arrangement for a vehicle, the transmission arrangement comprising:
a wet clutch that is a starting element which is engagable to start driving the vehicle;
a flow of lubricant being conveyed by a pump device which is driven by a drive motor of the vehicle, the pump device having a rotor that is connected to a drive shaft of the drive motor, and a housing that is connected to an output of the wet clutch, a volume of the flow of the lubricant conveyed by the pump device is proportional to a rotational speed difference between a rotational speed of the drive motor and a rotational speed of the wet clutch;
the transmission is a double clutch transmission which has a partial transmission and a double clutch module, the pump device is at least partially integrated into the double clutch module of the double clutch transmission and is positioned, in a direction of power flow, between the drive motor and the wet clutch; and
the double clutch module comprises the wet clutch and a second clutch, and the double clutch transmission comprises a plurality of gears, the wet clutch is engageable to drive the partial transmission which supports a lowest one of the plurality of gears of the double clutch transmission.

10. A transmission arrangement for a vehicle, the transmission arrangement comprising:
first and second partial transmissions, the first partial transmission meshes with at least a lowest gear of a plurality of transmission gears and the second partial transmission meshes with at least one other gear of the plurality of transmission gears, the first partial transmission being driven by a first shaft and the second partial transmission being driven by a second shaft;
a double clutch comprising first and second clutches, the first clutch is connected to the first partial transmission and is engagable to transmit drive from a drive shaft of an engine to the first shaft, the second clutch is connected to the second partial transmission and is engagable to transmit drive from the drive shaft of the engine to the second shaft, the first clutch is a starter element which is engaged to transmit drive from the drive shaft of the engine to the lowest gear of the plurality of transmission gears so as to start driving the vehicle; and a pump is located within the double clutch and comprises a rotor and a housing, the rotor is connected to the drive shaft of the engine and the housing is connected to the first shaft, the pump conveys a volume of lubricant to the first clutch which depends a difference in rotational speed between the rotational speed of the first shaft and the rotational speed of the drive shaft of the engine, the volume of the lubricant to be conveyed by the pump is proportional to the difference in rotational speeds of the first shaft and the drive shaft of the engine.

* * * * *